United States Patent
Reed

(10) Patent No.: US 11,711,616 B2
(45) Date of Patent: Jul. 25, 2023

(54) PORTABLE SYSTEM INCLUDING MOTORIZED BASE CONTROLLER AND TRANSMITTER FOR TRACKING A MOVING TARGET

(71) Applicant: Edward Reed, Highland, MD (US)

(72) Inventor: Edward Reed, Highland, MD (US)

(73) Assignee: ELECTROAPP, LLC, Ellicott City, MD (US)

( * ) Notice: Subject to any disclaimer, the term of this patent is extended or adjusted under 35 U.S.C. 154(b) by 79 days.

(21) Appl. No.: 17/316,837

(22) Filed: May 11, 2021

(65) Prior Publication Data

US 2021/0360161 A1 Nov. 18, 2021

Related U.S. Application Data

(60) Provisional application No. 63/023,408, filed on May 12, 2020.

(51) Int. Cl.
*H04N 23/695* (2023.01)
*H04N 7/18* (2006.01)
(Continued)

(52) U.S. Cl.
CPC ....... *H04N 23/695* (2023.01); *A63B 24/0003* (2013.01); *A63B 24/0021* (2013.01);
(Continued)

(58) Field of Classification Search
CPC .............. H04N 5/23299; H04N 23/695; A63B 24/0003; A63B 24/0021; A63B 71/08
See application file for complete search history.

(56) References Cited

U.S. PATENT DOCUMENTS

| 5,179,421 A | 1/1993 | Parker et al. |
|---|---|---|
| 8,704,904 B2 | 4/2014 | Boyle et al. |

(Continued)

FOREIGN PATENT DOCUMENTS

| CA | 2867127 A1 * | 9/2013 | ....... H04N 21/21805 |
|---|---|---|---|
| CH | 711985 B1 * | 6/2017 | |

(Continued)

OTHER PUBLICATIONS

Cook, Jeremy; "Rotary Input Battle: Encoders Vs. Potentiometers"; Tindie; Aug. 22, 2017; <https://blog.tindie.com/2017/08/potentiometers-vs-encoders/> (Year: 2017).*

*Primary Examiner* — John Villecco
(74) *Attorney, Agent, or Firm* — Royal W. Craig; Gordon Feinblatt LLC

(57) ABSTRACT

A system including a motorized base unit with a smart device mount for automatically orienting the smart device camera toward a moving target to track the moving target and take pictures or video. The target (e.g., a child playing soccer) wears a tracking tag comprising a GPS chip and transmitter packaged inside an athletic pad. The base unit includes a motorized mast for mounting a smart device. The base unit receives the transmitted GPS data, calculates updated pointing angle and angular velocity for the smart phone based on update location information from the remote tag sensor, calculates the correct angle that the smart phone should be pointed at, translates the new pointing directions to a control signal that turns the mast, which in turn causes the smart device camera to "follow" or track the target.

13 Claims, 11 Drawing Sheets

(51) Int. Cl.
  *A63B 24/00* (2006.01)
  *A63B 71/08* (2006.01)
  *H04N 23/51* (2023.01)
  *G01S 19/19* (2010.01)
  *G03B 17/56* (2021.01)

(52) U.S. Cl.
  CPC .............. *A63B 71/08* (2013.01); *G01S 19/19* (2013.01); *H04N 7/185* (2013.01); *A63B 2024/0025* (2013.01); *A63B 2220/12* (2013.01); *G03B 17/561* (2013.01); *H04N 23/51* (2023.01)

(56) References Cited

U.S. PATENT DOCUMENTS

| | | | |
|---|---|---|---|
| 9,007,476 B2 | 4/2015 | Glover | |
| 9,253,376 B2 | 2/2016 | Boyle et al. | |
| 9,294,669 B2 | 3/2016 | Glover | |
| 9,457,228 B2* | 10/2016 | Sinha | A63B 24/0003 |
| 9,495,759 B2* | 11/2016 | DeMartin | G01S 11/00 |
| 9,610,476 B1* | 4/2017 | Tran | A63B 24/0021 |
| 9,697,427 B2 | 7/2017 | Stout et al. | |
| 9,713,756 B1* | 7/2017 | Tran | G16H 20/30 |
| 9,717,958 B1* | 8/2017 | Tran | A63F 13/211 |
| 9,787,891 B2* | 10/2017 | Kamiya | G03B 13/16 |
| 9,800,769 B2 | 10/2017 | Taylor et al. | |
| 10,111,619 B2* | 10/2018 | Wang | A61B 5/742 |
| 10,200,834 B2* | 2/2019 | Tran | A61B 5/6804 |
| 10,281,554 B2* | 5/2019 | Wang | G01S 19/26 |
| 10,499,216 B2* | 12/2019 | Tran | G06F 1/163 |
| 10,560,621 B2 | 2/2020 | Rao et al. | |
| 10,602,929 B1* | 3/2020 | McKay | A61B 5/6806 |
| 10,677,887 B2* | 6/2020 | Glover | G06T 7/20 |
| 10,855,926 B2* | 12/2020 | Lee | H04M 1/72454 |
| 10,873,837 B2* | 12/2020 | Tran | G06V 40/28 |
| 11,159,734 B2* | 10/2021 | Lee | G03B 17/561 |
| 11,300,650 B2* | 4/2022 | Glover | G01S 5/02213 |
| 11,368,628 B2* | 6/2022 | Wisnia | H04N 5/23296 |
| 11,412,171 B2* | 8/2022 | Boyle | H04N 5/23245 |
| 2002/0057217 A1* | 5/2002 | Milnes | G01C 21/28 342/357.57 |
| 2003/0137589 A1* | 7/2003 | Miyata | H04N 23/695 348/211.6 |
| 2008/0002031 A1* | 1/2008 | Cana | G01S 5/0027 340/572.1 |
| 2009/0167867 A1* | 7/2009 | Lin | H04N 5/23299 348/169 |
| 2011/0199482 A1* | 8/2011 | Morgan | H04N 5/23299 348/143 |
| 2011/0228098 A1 | 9/2011 | Lamb et al. | |
| 2013/0162852 A1* | 6/2013 | Boyle | G06F 3/033 348/211.99 |
| 2013/0184613 A1* | 7/2013 | Homsi | G06F 17/00 600/595 |
| 2013/0230293 A1* | 9/2013 | Boyle | F16M 11/10 386/224 |
| 2013/0271602 A1* | 10/2013 | Bentley | G06V 40/25 348/143 |
| 2013/0300832 A1* | 11/2013 | Hohteri | H04N 5/262 348/157 |
| 2015/0016685 A1* | 1/2015 | Matsunaga | G06V 40/23 382/103 |
| 2018/0367739 A1* | 12/2018 | Messely | G06T 7/80 |
| 2019/0234131 A1* | 8/2019 | Seadia | E05F 15/71 |
| 2020/0186720 A1* | 6/2020 | Lee | G03B 17/561 |
| 2020/0329203 A1* | 10/2020 | Lee | G01S 3/783 |

FOREIGN PATENT DOCUMENTS

| | | | | |
|---|---|---|---|---|
| CN | 201178470 Y | * | 1/2009 | |
| CN | 106645152 A | * | 5/2017 | |
| DE | 102015003383 A1 | * | 9/2016 | |
| ES | 1242231 U | * | 2/2020 | |
| JP | 2004112615 A | * | 4/2004 | |
| JP | 2009008842 A | * | 1/2009 | |
| WO | WO-2018138697 A1 | * | 8/2018 | |
| WO | WO-2020229574 A1 | * | 11/2020 | ......... A63B 24/0062 |
| WO | WO-2021074468 A1 | * | 4/2021 | |

\* cited by examiner

PORTABLE SYSTEM INCLUDING MOTORIZED BASE CONTROLLER AND TRANSMITTER FOR TRACKING A MOVING TARGET

CROSS-REFERENCE TO RELATED APPLICATION(S)

The present application derives priority from U.S. provisional application Ser. No. 63/023,408 filed 12 May 2020.

BACKGROUND a. Field of Invention

The present invention relates to motion tracking and, more particularly, to a motion tracking solution capable of allowing a videographer to record high-quality video of an athlete participating in a sporting event.

b. Background of the Invention

As long as people have been participating in sporting events and activities, people have wanted to record their activities for viewing later and capturing these moments to share and to capture fond memories. This is particularly true for parents of children participating in youth sports who want to record their children playing. Solutions to date have been generally unsatisfactory for providing high quality at a low cost and ease of use for the player. For example, hiring a professional videographer to record the event generally provides a satisfactory solution for the quality of the video recording, but unsatisfactory in terms of the cost. As such, the primary solution to this problem has been for the parent to be the videographer. While satisfactory in terms of the cost, this compromises recording quality and detracts from the parents viewing experiencing. Also the existing location transmitter packaging has been non-compliant with uniform requirements and uncomfortable for the athlete. Various device-based tracking solutions have been proposed to assist with videography but have not provided a satisfactory solution.

For example, U.S. Pat. No. 5,179,421 to Parker et al. (ParkerVision, Inc.) issued Jan. 12, 1993 shows a camera tracker with a remote that a user can put on the belt or in a pocket and have a camera follow the user around by focusing on the remote, panning 360° in the horizontal and tilting in the vertical position. The remote includes an IR transmitter and tracking is accomplished with an array of receivers that find the "peak" and track the remote by repetitively calculating the angular displacement with respect to a reference angle to provide direction and rate of movement. The IR sensor requires line of sight and is therefore not usable for a sport played on a field with many players.

United States Patent Application 20110228098 by Lamb et al. published Sep. 22, 2011 shows a method to track an object with a video camera by a combination of using an IR sensor to determine a position of a tracking tag with an infrared (IR) transmitter; and automatically adjusting orientation of the camera as a function of the position of the IR transmitter as it follows movement of the object and the position of a recognized feature within the field of view. Systems that use infrared red light sources (IR) require line of sight to the target, which makes it impossible to track a participant on a crowded sports field and is limited for outdoor usage and range, and therefore not a good use for the application.

U.S. Pat. No. 10,560,621 to Rao et al. (Symbol Technologies) issued 11 Feb. 2020 shows a tracker for controlling a remote camera through a network. Here the tracker may be a mobile device 102 (FIG. 1) which can include an accelerometer, a gyroscope, a global positioning system (GPS) module, magnetometer, and digital compass, for example, and is coupled with face detection module used to track a location and/or an orientation of the face of the user and uses the zoom control of the mobile device 102. The tracking signal is transmitted by network connection to a server which controls a remote camera similar to a web cam and used in video conferencing. Face detection on a crowded fast-moving sports field is not practical. For this application the device will not operate properly. It is more intended for use with a single target and web conferencing.

U.S. Pat. No. 9,697,427 to Stout et al. (Jigabot, Ltd.) issued 4 Jul. 2017 shows system for tracking a cinematography target using multiple IR emitters worn by a target subject. Again, this system (as with any IR system) requires line of sight to the target which will be impossible on a crowded sports field and limited for outdoor usage and range.

U.S. Pat. Nos. 9,007,476 and 9,294,669 both to Glover (H4 Engineering) issued Apr. 14, 2015 and Mar. 22, 2016 show a remotely controlled automatic camera tracking system. The patents show the basic method of using a motorized base to mount and orient a camera based on signals sent from a remote tracking tag. The remote tag and base utilizes GPS data for location calculation, which has been used for many years for tracking purposes. The Glover et al patents allow for the calculation to take place in the remote control rather than the base to reduce power usage in the remote sensor and allows the user to start and stop a traditional camera or camcorder attached to the base and also control of zoom functions in the camera if possible. Although a good approach, it is not necessary and adds to the complexity of the system and reduces reliability. It does not utilize the functions available in a smart phone as proposed here and the integrated sensors and blue tooth connections to the control base which can provide increased integration and control of the built-in camera in the smart phone. The Glover et al patents also utilize an armband for the transmitter. Tracking tags worn by the person or player that look like a small black box worn on the arm of a player with a strap or arm band will not be accepted by the game officials (referees), and a tracking tag attached to the uniform will also cause discomfort to the player and reduce their playing level. A tracking tag integral to an athletic pad would be more appropriate for most sports or other activities.

U.S. Pat. Nos. 8,704,904 and 9,253,376 and 9,800,769 to Boyle et al. (H4 Engineering) issued Apr. 22, 2014, 2 Feb. 2016 and 24 Oct. 2017, respectively show a system for automatic pointing of a camera using an initial calibration where remote unit is collocated (this was corrected later to allow for 2 sensors—one in the remote and one in the base eliminating the need for collocated sensor to start) with the base unit and utilizes GPS tracking and coupled with IR sensors, collimated light beams or imaging software all of which require line of sight to the target and thereby not useful on a crowded sports field with many players wearing the same uniforms or helmets. In addition, the GPS tag worn by the target is not sport appropriate and may cause issues with the game officials and general discomfort U.S. Pat. No. 10,560,621 to Rao et al. issued Feb. 11, 2020 supplements the motion tracking component with image recognition. The computational overhead required for real time image processing is huge, and so the foregoing are only partial solutions and the range of use is limited and not sufficient for an outdoor sporting event (football field) with many similar people in identical uniforms.

What is needed is an economical and efficient tracking solution that provides precise initial calibration of the relative positions of the base unit and GPS-transmitting tracking tag, and which then uses it in combination with refined tracking method to provide smooth tracking of an athlete in motion, even when that athlete is mixed in with other participants wearing similar uniforms and at long distances. The remote target sensor needs to be constructed and packaged such that the unit can be worn by athletes participating in sports without infringing on the sports guidelines and rules for proper uniforms and equipment and creates no issues with sports officials and referees. Systems requiring direct line of sight (IR systems) or facial recognition or imaging technologies will not work when applied to a crowded sport field (soccer, lacrosse, football, etc.). The present solution utilizes improved control in the base station coupled with a sport-appropriate GPS remote tracker tag and the sensors and invokes control capabilities available in existing "smart devices" such as smart phones. People will use the cameras on their phones for the recording and the system will use it for operation. By utilizing the "smart" phone the videographer also gets to use the other "smart phone" functions to easily edit and share video files via the internet—easily send videos to coaches for example.

SUMMARY OF THE INVENTION

An object of this invention is therefore to overcome the foregoing inconveniences by providing a system with a motorized base unit with a smart device mount for automatically orienting the smart device camera toward a moving target and taking pictures or video.

For purposes of definition, "smart device" means any electronic device having an on-board processor and memory, and an on-board camera, and being capable of communicating to other smart devices or networks via a wireless protocol such as Bluetooth, Zigbee, NFC, WiFi, LiFi, 5G, etc.

A "portable smart device" means any hand-carried smart device.

A "smart phone" means any smart device with cellular communication capability.

The motorized base unit tracks a moving target with the smart device and takes pictures or video. The target (e.g., a child playing soccer) wears a tracking tag comprising a GPS chip and transmitter packaged inside an athletic pad, e.g., a shin pad for soccer. The base unit receives the transmitted GPS data and orients the smartphone camera at the target. The base unit includes a main controller with microprocessor for calculating an updated pointing angle and angular velocity for the smart phone based on update location information from the remote tag sensor. The current pointing direction of the smart phone is provided via a sensor mounted to the smartphone mounting bracket that provides intermittently-updated pointing directions as the motor rotates. In addition, the current location data of the base unit is wirelessly transmitted from the smart device to the base unit main controller, or alternatively is obtained locally from a GPS receiver mounted in the base unit. Given 1) the current location of the base unit; 2) the current pointing angle of the smartphone device; and 3) the GPS location of the remote target sensor, the base unit main microprocessor controller can calculate the correct angle that the smart phone should be directed to or "pointed at" to have the target in line and pointed to by the smart phone camera. This new pointing direction are translated to a control signal that turns an electric stepper motor. As the process is repeated, the smart phone device will "follow" or track the target. The video functions in existing smart phone devices can be employed and the video files saved on the smart phone for future viewing, editing, emailing, uploading to social media etc. In addition, a specialized software application (App) may be installed in the smart device to take advantage of the present system capabilities. The smart device App may provide, for example, a "highlights" mode of operation by which it continuously buffers video. When the videographer presses a "highlights" button a duration of buffered video immediately preceding and following is saved as a recorded video file.

The base unit is portable, battery operated, and sized such that it can be easily transported and mounted on a traditional standard tripod. The tracking tag (GPS, communication chips, battery) is packaged into an athletic pad that the target subject wears during a sporting event or any event. In an embodiment, the tracking tag is a shin pad for soccer. However, the tracking tag may alternately be an elbow pad for use in lacrosse, a leg pad for use in football, or any other general-purpose athletic pad for use with other sports without departing from the scope or spirit of the invention.

BRIEF DESCRIPTION OF THE DRAWINGS

Additional aspects of the present invention will become evident upon reviewing the embodiments described in the specification and the claims taken in conjunction with the accompanying figures, wherein like numerals designate like elements, and wherein:

DETAILED DESCRIPTION OF THE PREFERRED EMBODIMENT

The present invention is a motion tracking solution capable of allowing a videographer to record high-quality video of an athlete participating in a sporting event. An athlete (e.g., a child playing soccer) wears a tracking tag comprising a GPS chip and transmitter. The GPS tracking tag periodically transmits GPS data to a base unit, which receives the transmitted GPS data and automatically orients the smartphone camera toward the moving athlete for taking pictures or video. The base unit generally includes a housing, an articulating smartphone mounting bracket mounted to the housing, a stepper-motor for turning the mounting bracket, and an orientation (pointing direction) sensor for determining current pointing direction of the smart phone, a processor including memory and associated electronics, and optionally a GPS chip.

Current location data of the base unit is wirelessly transmitted from the smart device to the base unit, or alternatively is obtained locally from the GPS receiver mounted in the base unit. Current location of the remote target sensor is wirelessly transmitted from the target to the base unit. The pointing sensor (mounted to the smartphone mounting bracket) updates the current pointing direction of the smart device as the motor rotates. Given 1) the realtime location of the base unit; 2) the realtime pointing angle of the smartphone device; and 3) the GPS location of the remote target sensor, the base unit processor calculates 1) an updated (delta) pointing angle; and 2) an updated (delta) angular velocity for the smart phone based on updated location information from the GPS tracking tag. By using the current location data of the base unit which is wirelessly transmitted from the smart phone device to the main controller in the base (or derived from an onboard GPS receiver on the base unit main controller) and current pointing angle of the smartphone device coupled with the GPS location of the remote target sensor, the base unit processor is able to calculate the correct angle that the smart phone should be directed to or "pointed at", and also the velocity needed, so as to keep the target centered in the smart phone camera field of view. This new pointing directions and velocity are translated to a pulse-width-modulated (PWM) control signal that turns the stepper motor. The process repeats, resulting in the smart phone "following" or tracking the target. Video functions in the smart phone can be actuated and the video files saved on the smart phone for future viewing, editing, emailing, uploading to social media etc. The device is portable, battery operated, and sized such that it can be easily transported and mounted on a traditional standard tripod. The tracking tag (GPS, communication chips, battery) is packaged in an athletic pad that the target subject wears as part of their standard uniform.

Figure 1:
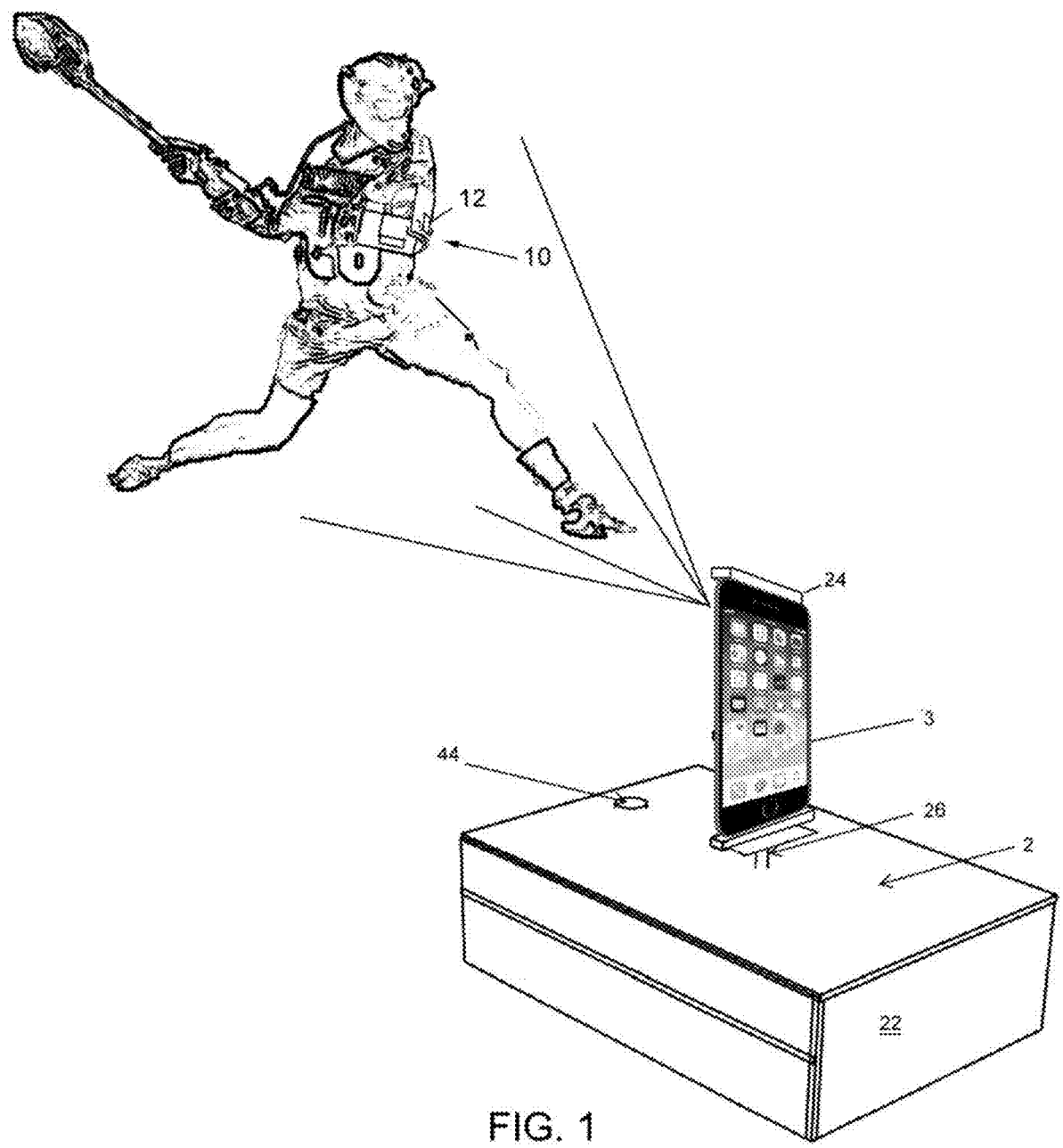
FIG. 1 is a side perspective view of the system for automatically orienting a smartphone camera toward a moving target and taking pictures or video according to an embodiment of the invention.
Figure 2:
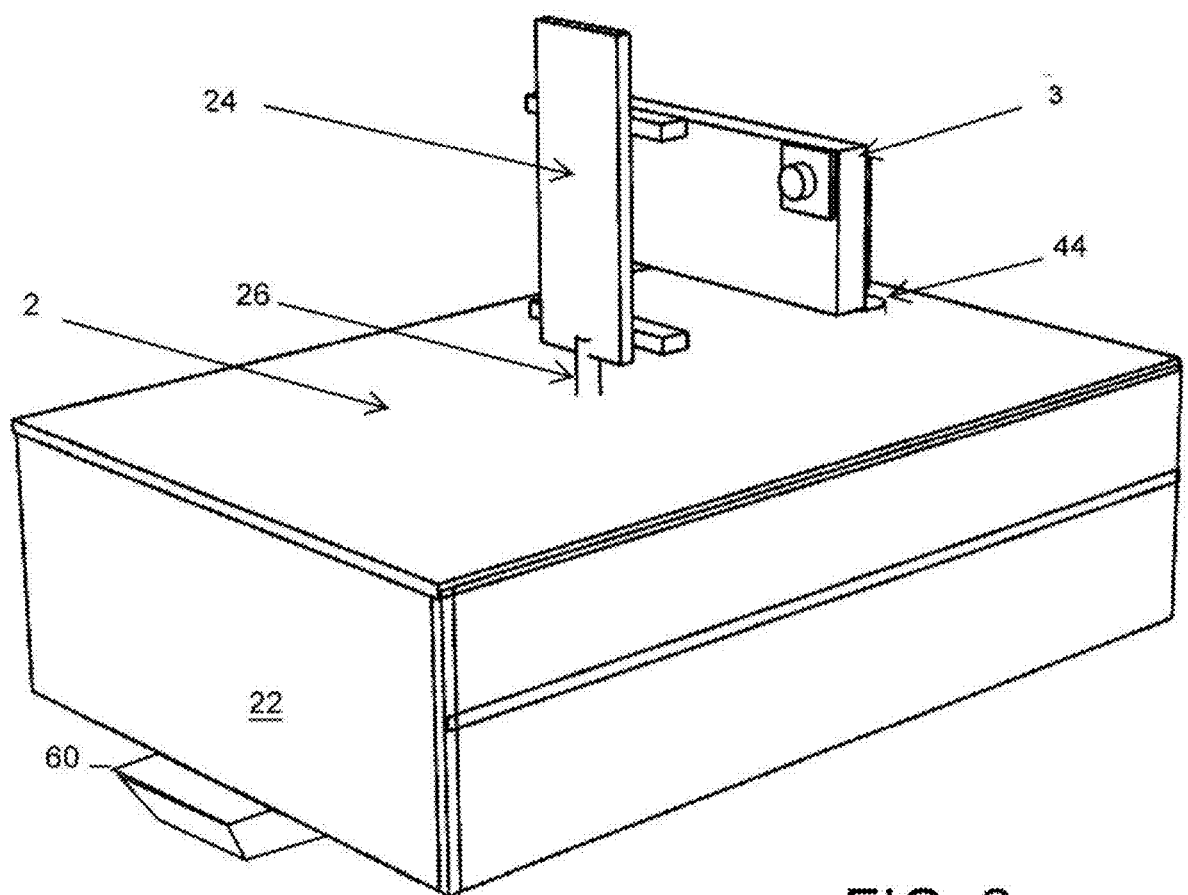
FIG. 2 is an opposite side perspective view of the system of FIG. 1.
Figure 15:
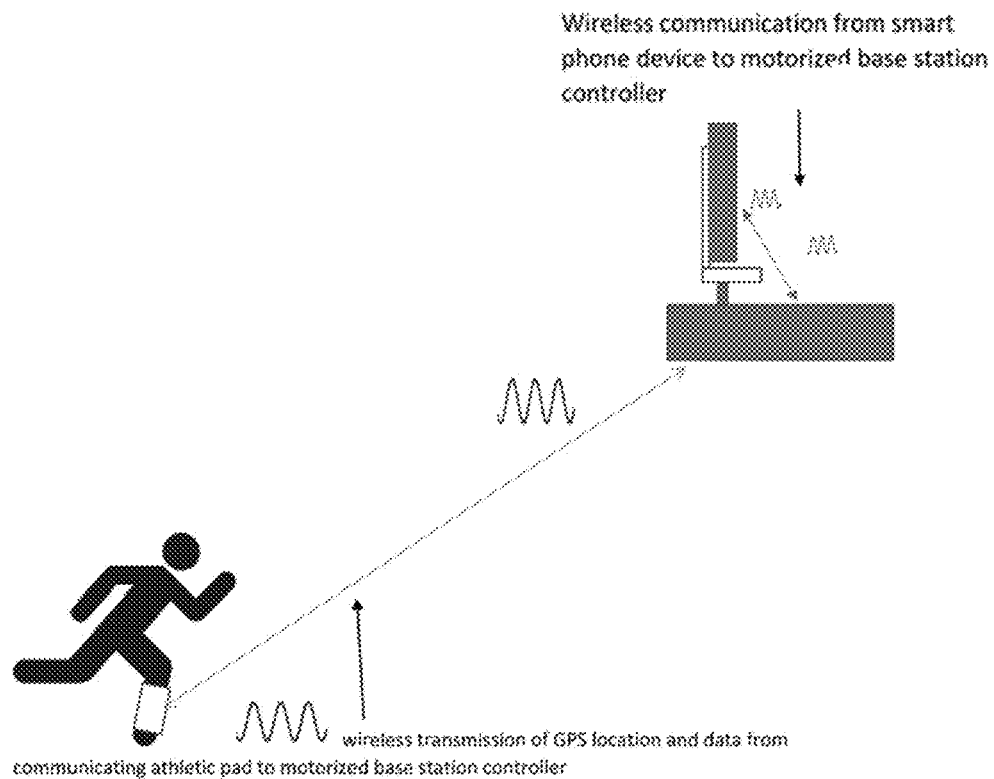
FIG. 15 shows the remote communicating architecture with GPS tracking module 12 communicating to motorized base unit 2 and the base station communicating to smart phone device

FIGS. 1, 2 and 15 are perspective views of the system for automatically orienting smartphone 3 camera including an athletic protective pad 10 with integral GPS tracking module 12. Tracking module 12 periodically transmits GPS data to a base unit 2, which receives the transmitted GPS data and automatically orients the smartphone 3 camera toward the moving athlete for taking pictures or video. The base unit 2 generally includes a housing 22, an articulating smartphone mounting bracket 24 mounted to the housing 22, a stepper-motor 49 (inside housing 220) for turning the mounting bracket 24, and an orientation or pointing direction sensor 29 (also inside housing 22) for determining current pointing direction of the smart phone 3. In the illustrated embodiment the pointing sensor 29 is mounted proximate the shaft 26 and is connected via a timing belt assembly to the stepper motor 49, and it updates the current pointing direction as the step motor 49 rotates. One skilled in the art will understand that the function of the pointing direction sensor 29 may be replaced or supplemented with an existing compass integral to the smartphone. In addition, a processor 42 resides inside housing 22 including memory and associated electronics.

In operation, given the communication architecture of FIG. 15, GPS tracking module 12 communicates wirelessly with motorized base unit 2. The processor 42 commands and drives the stepper motor 49 based on a calculated distance, direction and velocity. As the target moves, new target GPS data is sent from the remote GPS tracking tag 12 to the base unit 2 wirelessly. Base unit 2 processor compares the new target sensor GPS location data to the old target GPS data, in addition to the location of the base unit 2 and the current pointing angle of the smartphone 3, and computes a new pointing angle and the velocity for the smart phone device. The new angle/velocity is calculated and the motor is controlled and rotates to this new angular velocity. Upon receipt of new target sensor GPS location data, the process is repeated, and the smart phone 3 will "follow" or track the target smoothly and accurately. The video functions in the smart phone 3 can be employed and the video files saved on the smart phone 3 for future viewing, editing, emailing, uploading to social media etc.

The smart phone 3 may be any of various "smart" phone devices (Apple iPhone, Samsung Galaxy, LG and others), and is preferably equipped with an installed software App provided as part of the system herein to control said video and other functions.

In an embodiment the function of the pointing direction sensor 29 monitoring angle of shaft 26 may be replaced or supplemented by the smartphone 3 itself and installed App, provided that the smart phone 3 is of a type having an internal compass and can output orientation.

Figure 3:
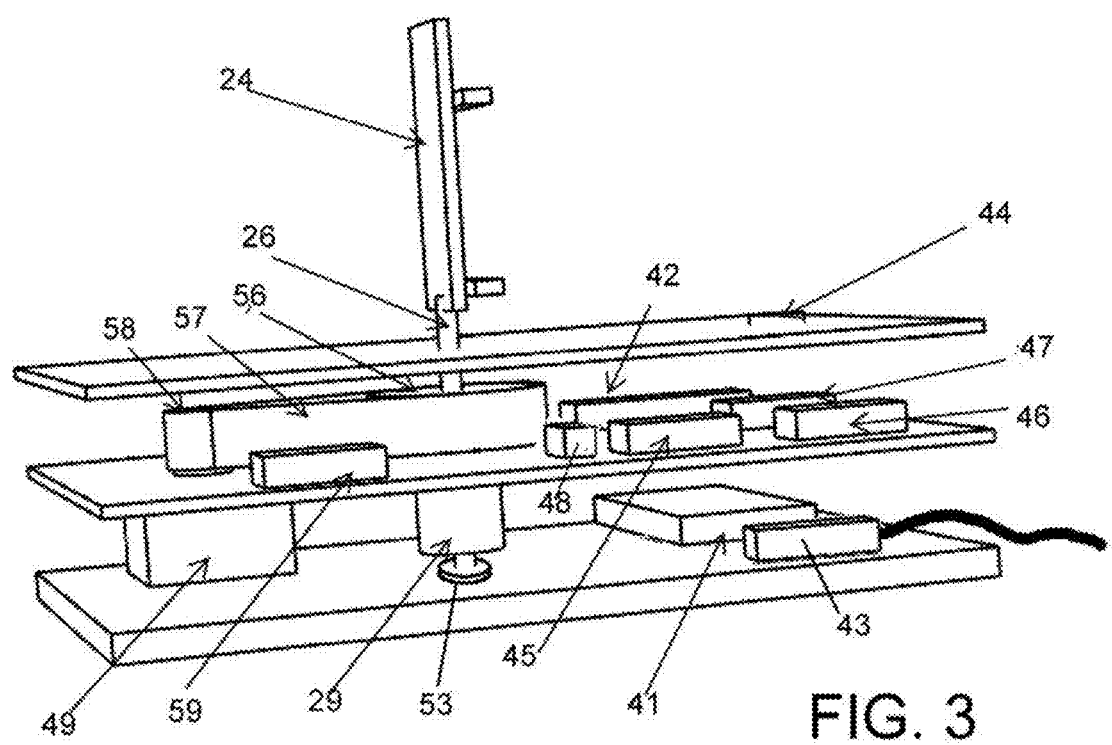
FIG. 3 is an internal view of the base unit 2.

As seen in FIG. 3, enclosure 22 houses a multi-layer PC assembly including a main board (middle) seating primary electronic devices including processor 42, motor driver controller 45, and wireless communication devices 46, 47. One wireless communication device 46 communicates with the tracking module 12 and one 47 with the smart phone 3. In a preferred embodiment of the present invention, the wireless communication devices 46, 47 are 900 Mhz radio transceivers but could alternately be Bluetooth, WIFI, ZigBee etc.

Adjustable device mounting bracket 24 rotates above housing 22 on shaft 26 for generic use with a variety of smart phone devices 3, and the shaft 26 protrudes down through main board to a lower board containing low voltage electric stepper motor 49, and rechargeable battery 41. Shaft 26 is preferably journaled into a bearing 53 on the lower board for frictionless rotation. In addition, for vibration-free operation the shaft 26 is damped. This is accomplished with a belt-drive inclusive of a rubber belt 57 connected between a small pulley 58 on the motor 49 shaft and a large pulley 56 on the shaft 26 of the adjustable device mounting bracket 24, the pulley size differential providing speed reduction and increased torque. In another embodiment a spur gear, worm gear, gear motor or other method of speed reduction could be used.

Battery 41 is connected to a charging controller IC chip 43 that manages and recharges the battery 41 by attaching a cable as is typical for charging smart phones by the user. For example, a mini-USB connection is very commonly used for this purpose.

Motor driver controller 45 may be a commercially-available two-axis motor controller/driver module capable of supporting a bi-phase bipolar stepper motor 49, a variety of which are commercially available. For example, a Toshiba TB67S128FTG microstepping bipolar stepper motor drive controller 45 will suffice.

In an alternate embodiment a second motor and motor driver controller 45 (or a second motor and dual-motor 3-axis motor driver controller) can be added to additionally provide control and position along vertical axes, thereby allowing the smart device to track up and down vertically in conjunction with the horizontal. The very same approach to control can be used for vertical operation, thereby allowing the device to track in three-dimensions.

An optional GPS chip 48 may be provided on the main board to provide current location data of the base unit 2 to processor 42. Preferably, as indicated above, location data for the base unit 2 is wirelessly transmitted from the smart device mounted in bracket 24 to the base unit 2. However, the location data for the base unit 2 must be accurate for present purposes and many smart devices employ low grade GPS chips that do not provide the requisite accuracy. One skilled in the art will understand that more accurate location data of the base unit 2 can be obtained locally from the GPS receiver 48 mounted in the base unit 2, can be obtained remotely from a cellular service, or from any other third party source of more accurate location data.

The initial orientation and pointing direction of smartphone mounting bracket 24 is unknown at startup and so the smartphone device mounting bracket 24 may be manually aligned with the remote target sensor (orientation sensor 29). A detent button 44 is positioned on housing 22 and may be pressed to indicate alignment. Alternatively, a soft button 44 may be provided by the App on smart phone 3 for interaction with the user. Switch 44 causes the current pointing angle to be captured using orientation sensor 29. In an embodiment orientation sensor 29 is a potentiometer mounted to the bottom of the smart phone mounting bracket shaft 26. The potentiometer 29 is a variable resistance device that provides absolute position information with a shaft and with three wires connected to it. One wire is the nominal system control voltage for the system—3.3 VDC or 5 VDC, the other wire is system voltage ground and the third wire is referred to as the "wiper" which is a variable resistance/voltage output. As the shaft rotates, the resistance varies between the "wiper" and the system voltage and ground and the voltage output on the "wiper" terminal varies accordingly. The variable voltage output provides an absolute value of the current shaft position and thereby the pointing direction of the smart phone device mounting bracket 24. The potentiometer-type pointing direction sensor 29 offers the advantage of not requiring a homing sequence or similar initial location calibration as would be required when using relative positioning devices like encoders. Also, using an absolute positioning device like the potentiometer for pointing direction sensor 29 ensures that the unit never loses its location pointing direction or gets "lost" even with disruptions during use, which is not true of systems using relative pointing devices. In another embodiment, the pointing angle of the smart phone mounting bracket 24 may be obtained from the smart phone 3 directly using its available magnetometer output (compass) data transmitted wirelessly to the main controller in the base via bluetooth or other similar wireless connections. In this case no orientation sensor 29 is required. In a preferred embodiment (described in detail below) both orientation data sources are used as a cross-check and backup. In another embodiment, additional information from the smart phone 3 including Quaternion (orientation), Accelerometer, and Gyroscope data are used to determine current pointing angle and mounting bracket angular velocity to improve target tracking.

In addition, housing 22 is preferably equipped with a base mounting bracket 60 suitable for releasable mounting on a conventional tripod.

Figure 4:
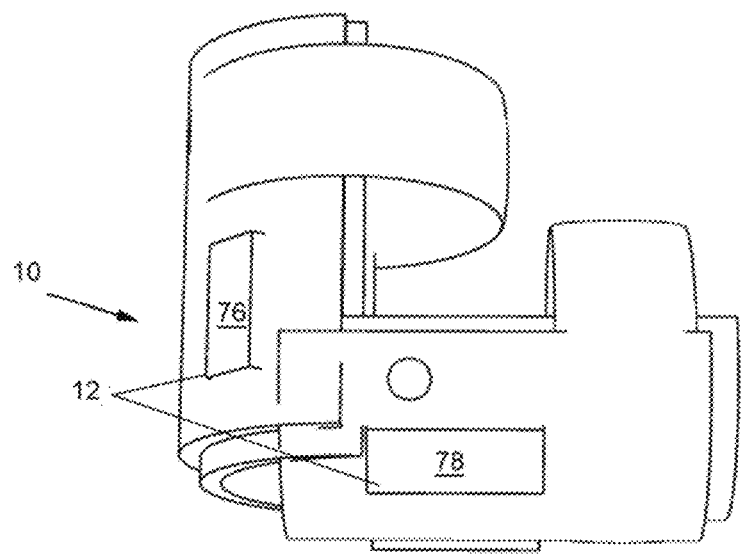
FIG. 4 is a side perspective view of the athletic pad 10 according to an embodiment of the invention.
Figure 5:
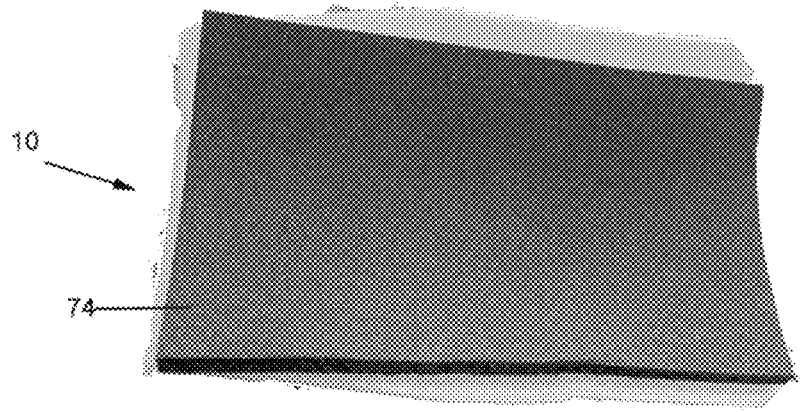
FIG. 5 is an opposite side perspective view of the athletic pad 10 of FIG. 4.
Figure 6:
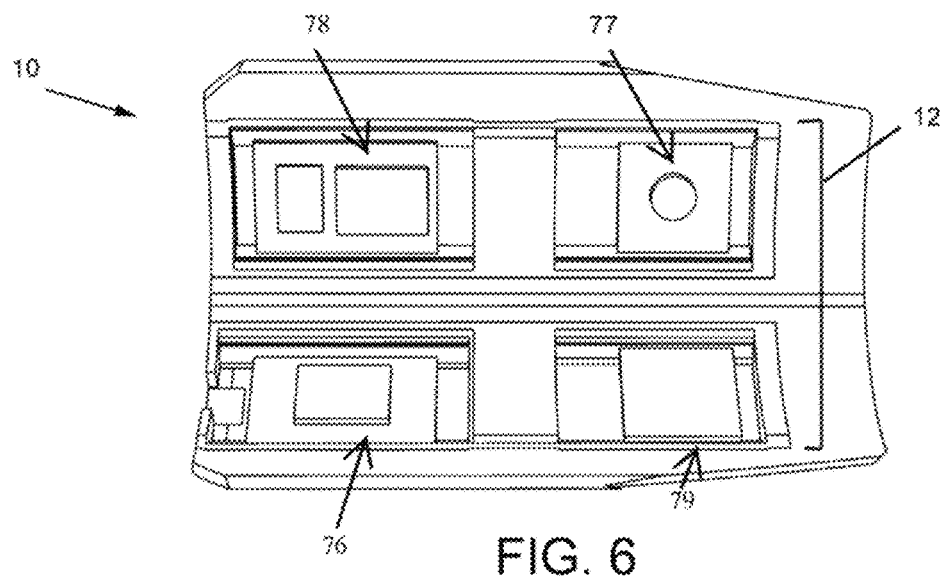
FIG. 6 is a perspective view of the athletic pad 10 with foam layer 74 removed to expose GPS tracking module 12.

FIGS. 4-6 illustrate one example of the athletic protective pad 10 with integral GPS tracking module 12. The athletic protective pad 10 comprises a suitable hard yet resilient synthetic material able to withstand the bending and harsh impacts inherent to competition. Such materials are known in the art, and include nylon, polypropylene (PP), polyethylene (PE), amorphous polar plastics (e.g., polycarbonate (PC)), polymethylmethacrylate (PMMA), polystyrene (PS), high impact polystyrene (HIPS), polyphenylene oxide (PPO), glycol modified polyethylene teraphthalate (PETG), acrylonitrile butadiene styrene (ABS), semicrystalline polar plastics (e.g., polyester PET and PBT), polyamide (e.g., Nylon 6 and Nylon 66), urethane, polyketone, polybutylerie terephalate, acetals (e.g., Delrin™ by DuPont), acrylic, acrylic-styrene-acrylonitrile (ASA), metallocene ethylene-propylene-diene terpolymer (EPDM) Nordel™ by DuPont), or composites.

The protective pad 10 is molded in a partial convex arch to conform to a limb such as, for example, the elbow, forearm or shin, as illustrated, and preferably includes four molded recesses 72 open inwardly to the arch for seating the electrical components of GPS tracking module 12. One skilled in the art will understand that other electronic component mounting schemes may be used. The electrical components of GPS tracking module 12 are individually seated in the molded recesses 72, adhered (or molded) therein, and covered by a protective foam padding layer 74 as seen in FIG. 5. The athletic protective pad may be modified in construction and form to serve as a shin pad, elbow pad, forearm pad or leg pad as required for different sports but of similar construction and function as noted herein.

FIG. 6 shows the electrical submodules of GPS tracking module 12 individually seated in their four molded recesses 72. They include a commercially available GPS module 76 that can track multiple satellites and do minimally several updates a second for high speed, high sensitivity tracking. A preferred GPS module 76 is built around the MTK3339 chipset, which can track up to 22 satellites on 66 channels, is low-power, has a high-sensitivity receiver, built in antenna, and can do up to ten location updates a second. The GPS module 76 is connected to a processor module 78 with integrated wireless transceiver. An ARM™ Cortex M0+ Wireless Microcontroller with SX1231 transceiver is well-suited inasmuch as it is a long range 900 Mhz packet radio transceiver for better range than Bluetooth yet without the high power requirements of WiFi (although either Bluetooth or WiFi may suffice). The processor/transceiver module 78 and GPS module 76 are connected to a battery 79, such as a 3.7V lithium polymer battery, and all the foregoing components 76-79 are connected through a detent activation switch 77. When switch 77 is activated the GPS module 76 immediately begins logging GPS coordinates and timestamps, and transceiver 77 periodically transmits this GPS/timing data (up to ten times a second) to base unit 2.

At the base unit 2 (FIG. 3) the GPS coordinates with timestamps are received by transceiver 59 and are communicated to the base station processor 42.

In sum, the base station processor 42 uses the GPS location/timing data from GPS tracking module 12 to calculate a pointing angle between the motorized base unit 2 and the GPS tracking module 12 using trigonometric math equations. The current pointing angle of the smart phone 3 is known from the orientation sensor 29 or internal Magnetometer (compass) in the smart phone device. As the athlete moves, the GPS tracking module 12 moves, and new GPS coordinates and timestamps are transmitted ten times a second to the base unit 2. Each time, the base unit 2 processor computes a new required pointing angle and velocity needed to reorient and control smart phone mounting bracket 24. The pointing angle value is used to position the motor shaft 26 and "point" the smart phone device mounting bracket 24, and the computed velocity is used to calculate the needed speed of the motor 49 to reorient smart phone mounting bracket 24 and thereby the smart phone 3 to track the target. As the data is updated and angle and velocity recalculated, the smart phone 3 effectively and smoothly follows or "tracks" the remote GPS tracking module 12 as it moves. Tracking as a function of velocity is superior to prior art units that do not control based on velocity but rather use only point-to-point movements. The foregoing technique is implemented by software resident in the base station processor 42. FIGS. 7-10 are flow charts of the software sequence.

Figure 7:
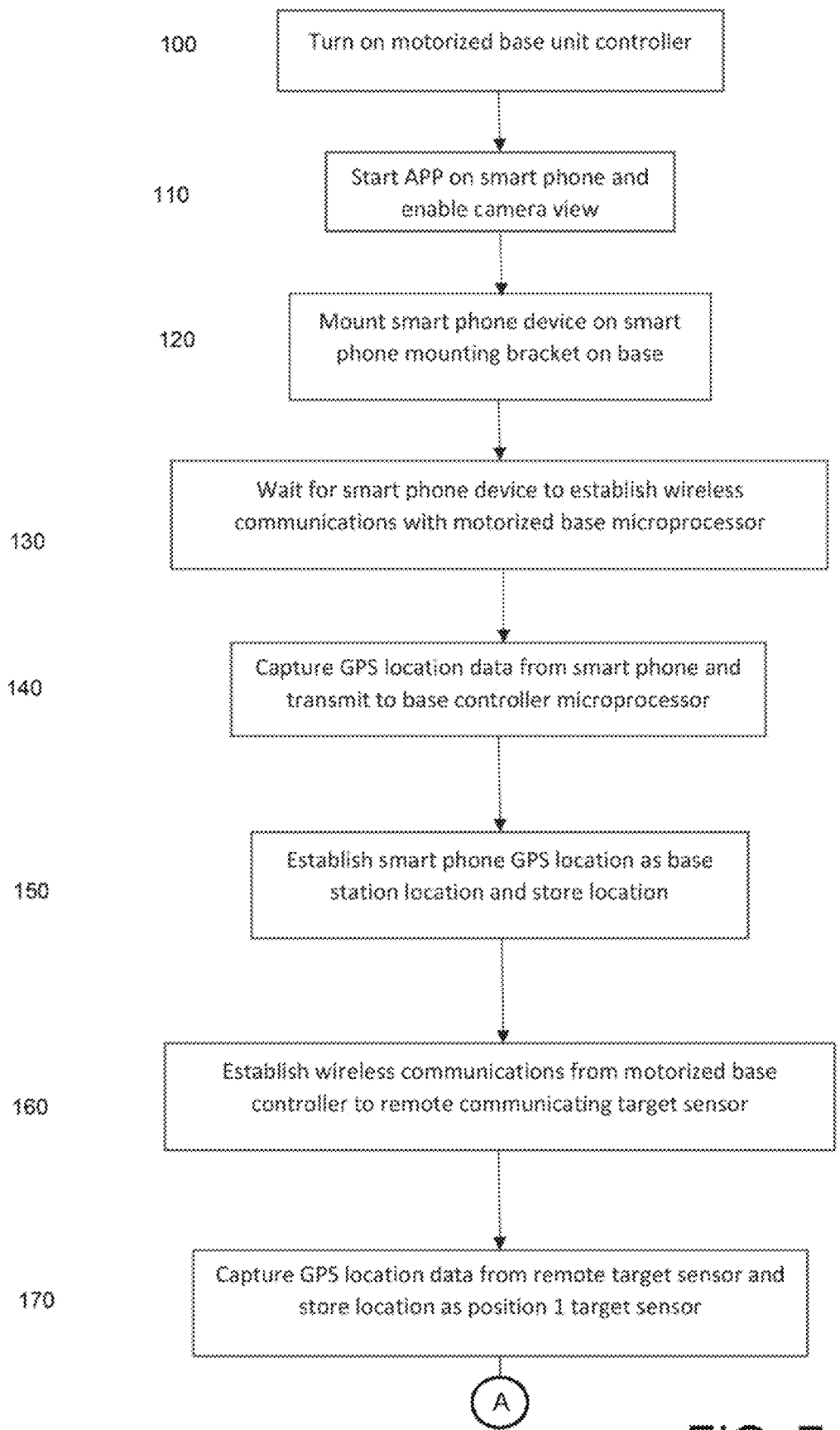
FIGS. 7-9 shows a flow chart illustrating the base unit 2 startup procedure.

With reference to FIG. 7, at step 100 turning on the base unit via switch 44 (of FIGS. 1-3) commences initial start operation (later on—alignment operation). At step 110 the user initiates their smartphone 3 App. The user receives operating instruction using the screen of the smart phone and enables camera view. Next, at step 120 the user mounts the smart phone 3 on the bracket 22 of base unit 2. At step 130 the smartphone 3 establishes a wireless connection with the base unit 2 via wireless communication devices 44, 46. At step 140 the base unit 2 processor 42 begins capturing GPS location data from the smart phone 3. At step 150 the initial smart phone GPS location data is used to fix the smart phone location relative to the base unit 2 location and this is stored as "base station location." Again, an on board GPS chip 48 in the motorized base unit 2 may also be used to provide the base unit location. At step 160 the GPS tracking tag 12 is actuated via switch 77 (FIG. 6), and wireless communications are established from base unit 2 to GPS tracking tag 12 via radio 78. At step 170 the initial GPS tracking module 12 location is stored as "position 1 target sensor".

Figure 8:
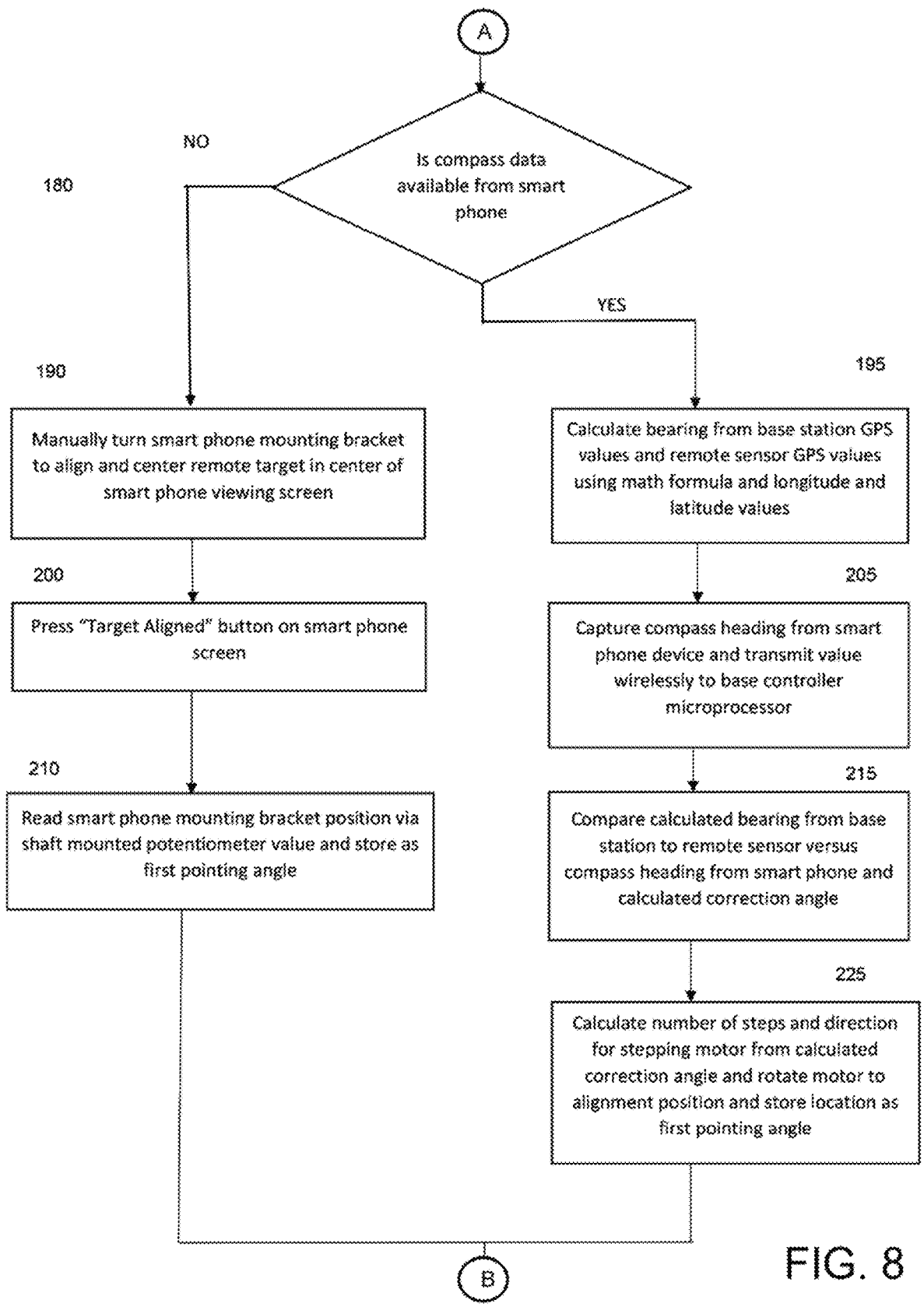

Program flow proceeds to FIG. 8, where at step 180 the base unit 2 processor 42 polls the smart phone 3 for orientation data and its GPS coordinate data. A typical smart phone has many sensors including three accelerometers (one for every axis, x, y and z), a gyroscope, and a magnetometer. The gyroscope detects the orientation of the phone (pitch, roll and yaw around an axis) and the magnetometer provide pointing direction as compass heading data. However, some smart phones may lack a suitable magnetometer and gyroscope output and cannot provide orientation data. If smart phone 3 has a suitable magnetometer and gyroscope output then flow proceed to step 195 where base unit 2 processor 42 calculates the horizontal bearing of the GPS tracking module 12 from the base unit 2 using GPS values "base station location" and "position 1 target sensor", using a math formula and longitude and latitude values.

At step 205 the base unit 2 processor 42 polls the smart phone 3 for its gyroscope/compass heading and GPS data, and at step 210 processor 42 compares its calculated bearing from the base unit 2 to the GPS tracking tag 10 to the gyroscope/compass heading transmitted from smart phone 3, and calculates a "correction angle." At step 225 processor 42 translates the "correction angle" into pulse commands (number and direction of pulses required to cause the motor 49 to adjust the correction angle, e.g., 200 pulses clockwise to turn one half revolution). Processor 41 sends a complete set of pulse commands (number, direction, rate) to the motor driver controller 45 which controls the motor 49 to implement the pulse-width modulated (PWM) command set. Processor 41 stores this initial alignment position as the "first pointing angle."

One skilled in the art should understand that using two sets of GPS data available from both the smart phone 3 (or base unit 2) plus GPS tracking module 12 offers many advantages including not requiring the GPS tracking module 12 to be collocated or calibrated at the base unit 2. The same is true of the use of gyroscope/compass data from the smart phone 3 as this allows the base unit 2 to know in which direction the smart phone mounting bracket 24 and smart phone 3 are actually pointing. Thus, by utilizing the gyro/compass data from the smart phone 3 the initial pointing angle is known and videography can begin without any initial alignment procedure. Using the gyro/compass data from the smart phone 3 facilitates an AUTO-alignment function (described below in regard to FIGS. 7-8). The system can be turned on and operation started with the GPS tracking module 12 being located anywhere in the general area. Consequently a sports player wearing the athletic pad 10 can already be on the playing field when the system is turned on and the system will start normally.

On the other hand, if smart phone 3 lacks a gyroscope and magnetometer output and cannot provide orientation data, flow proceeds to step 190 where the user is prompted on their smart phone 3 to manually turn the smart phone mounting bracket 24 until the target (athlete) is centered in the field of view (and appears centrally on the smart phone 3 viewing screen). The smart phone App provides some functionality including a "Target Aligned" button, and at step 200 this is pressed to indicate manual alignment. At step 210 the processor 42 reads the smart phone mounting bracket 24 position from the shaft-mounted potentiometer and stores this value as "first pointing angle."

Figure 9:
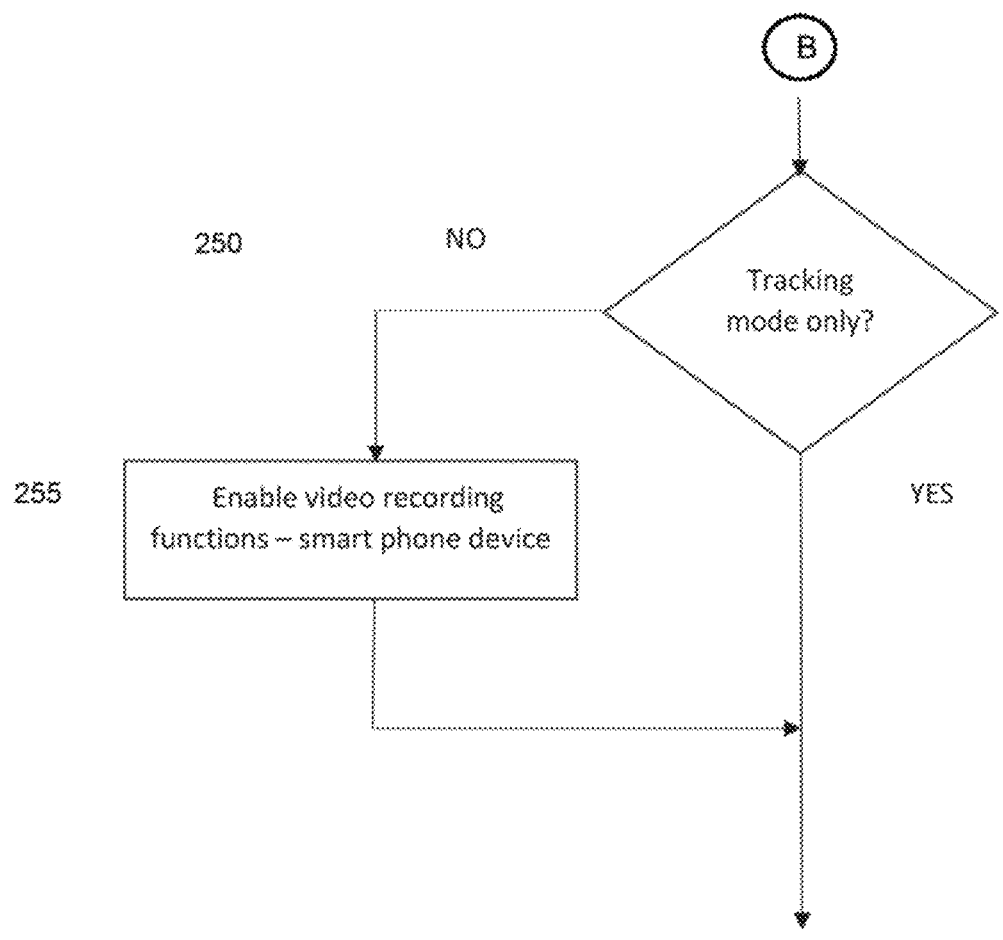

In either foregoing case of manual alignment or automatic alignment, the smart phone mounting bracket 24 is properly positioned and processor 42 stores initial alignment position as the "first pointing angle." Process flow proceeds to FIG. 9, where the user is prompted by the smart phone 3 App to indicate "Tracking Mode Only?" (versus live photography). This is important inasmuch as the base unit 2 can be used for pointing conventional cameras and video recorders, mounting them in bracket 24 and using the smart phone 3 as a remote control. "Tracking Mode" simply tells the smart phone 3 that it is being used as such. However, if at step 225 the user responds "No" then the smart phone 3 enables video recording functions of the smart phone camera.

Figure 10:
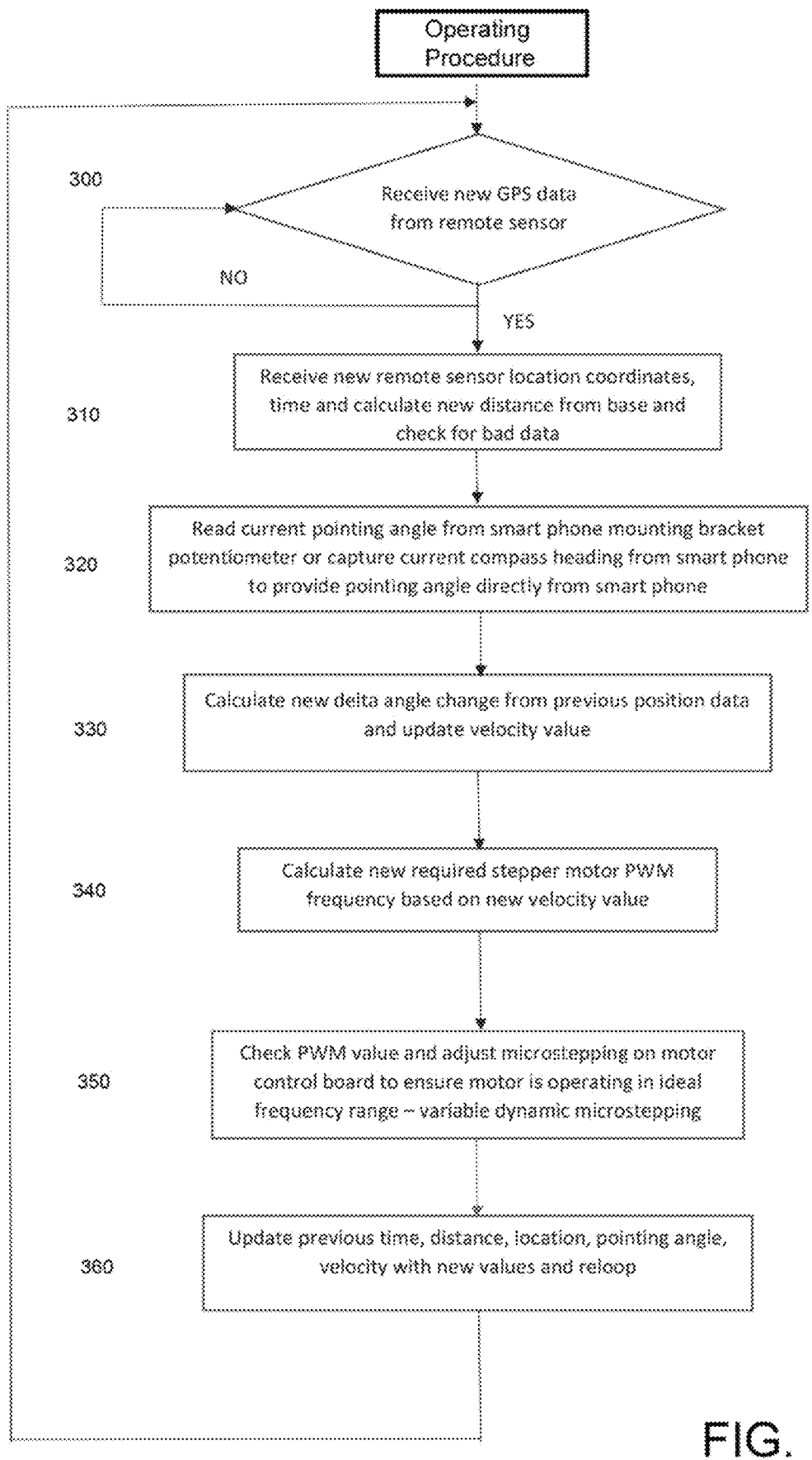
FIG. 10 shows a flow chart illustrating the base unit 2 operating procedure.

With alignment operation complete, program flow proceeds to FIG. 10 and normal operation. At step 300 the processor 42 waits for base unit 2 to receive new GPS data and timestamp from GPS tracking module 12. When it does, then at step 310 base unit 2 processor 42 stores "position 2 target sensor" and time, and uses the new GPS tracking module 12 coordinates and time at step 310 to calculate the new distance of the GPS tracking module 12 from the base unit 2. Processor 41 checks for bad data by comparing each calculated new distance to a maximum threshold, and discards any calculated new distance that exceeds the threshold. The maximum threshold is set based on the maximum possible distance that a target is expected to move per time increment and reflects a rule of reason Being that an athlete is physically capable of only moving in small incremental distances and angular changes within each time increment, processor 41 checks for large changes in location data and this data is assumed to be "bad." All invalid data is disregarded and not used to make changes to the current velocity value and the processor 42 waits for base unit 2 to receive new GPS data and timestamp from GPS tracking module 12. Other values are checked like the time value from the GPS for example and values outside of expected values and not used—no change in the time value for example or a zero-value returned from the GPS coordinates is considered invalid and skipped.

At step 320 processor 42 reads the current pointing angle from smart phone mounting bracket 24 orientation sensor 29 or captures the current compass heading from smart phone 3 as explained in regard to FIGS. 7-10.

At step 330 processor 42 calculates a new delta angle change from the "first pointing angle" to the "second pointing angle." Processor 41 also calculates from the timestamps a new velocity value based on rate of change from the "first pointing angle" to the "second pointing angle" and updates the velocity value accordingly.

Control of the motor 49 is critical to providing good tracking and keeping the target and the smart phone mounting bracket 24 aligned. As the bae unit 2 processor 42 receives new updated GPS location data from the GPS tracking module 12 and, coupled with the GPS location for the base unit 2 (derived from the smart phone 3), and the current pointing angle for the smart phone mounting bracket 24, a new "delta" pointing angle and new "delta" angular speed is calculated. The delta pointing angle is calculated by the processor 42 using the following equation with longitude and latitude data derived from the corresponding GPS data for the GPS tracking module 12 and base unit 2:

$$\text{New bearing calculated} = \operatorname{atan} 2(y, x)$$

where
$y = \sin(\text{lon2} - \text{lon1}) * \cos(\text{lat2})$ and
$x = \cos(\text{lat1}) * \sin(\text{lat2}) - \sin(\text{lat1}) * \cos(\text{lat2}) * \cos(\text{lon2} - \text{lon1})$ After a new bearing is calculated as above, the correction angle is calculated as the new required position or bearing versus the previous bearing or pointing angle. The time from the last GPS data and the new GPS is stored and compared. In an example the delta angle for correction may be 2 degrees. The corresponding pulses required for the PWM signals for stepper motor 49 to match the required target location are calculated as steps required=degrees required*steps/degrees*, and the motor driver circuit board 45 is commanded to provide the required number of pulses to the motor 49 to change and rotate the direction of the smart phone mounting bracket 24 such that it points in the new required pointing angle to align with the remote target sensor. The rate of the movement of the smart phone mounting bracket 24 from point to point is determined from the calculated target velocity and used to set the speed to match the target movement rate, thereby providing smooth video and excellent tracking.

In addition it is desirable to match the moving velocity of the target athlete rather than simply rotating the smart phone mounting bracket 24 from point to point. Consequently, In addition to the GPS data, the timestamps of that data are also communicated to the processor 42 (or smart phone directly). This allows calculation of timing differential and then the actual speed of the moving target.

Next at step 340 processor 42 translates the "delta velocity" and "delta angle" into pulse rate commands (number and direction of pulses required to cause the motor 49 to adjust the delta angle velocity). The motor controller circuit board 45 is sent a continuous stream of pulses from the main microprocessor 42 using a variable continuous PWM (pulse width modulated) output. The frequency of the PWM is varied based on the calculated target speed. This provide for smooth tracking of the remote target athlete (lacrosse or soccer player for example).

Importantly, at step 350 the processor 42 checks the calculated PWM values and dynamically adjusts the microstepping factor on the motor control board 45 to ensure the motor 42 is operating in its ideal frequency range (known as "variable dynamic microstepping"). Microstepping is a way of controlling a stepper motor more smoothly than in full steps, e.g., the motor may be microstepped using ⅟₃₂ steps. Microstepping results in less vibration, makes noiseless stepping possible, and makes smaller step angles, lower speeds and better positioning possible. The net result is vastly better video quality. On the other hand, stepper motors have an optimum range of operational frequencies. The calculated velocity value may vary greatly depending on the difference in target minimum and maximum speeds, the distance from the target to the base unit 2 and smart phone mounting bracket 24, etc. Stepper motors operate best in a certain range of speeds and also when controlled with a PWM frequency within a certain frequency range. The motor controller 45 can be configured to operate in microstepping mode. Microstepping is a technique where the motor control board can make the stepper motor operate in such a way that additional steps are allowed within the same number of "real steps" (microsteps) to provide better control and operation at lower speeds. For example, a stepper motor designed for 200 steps per revolution can be controlled to operate with ⅛ microstepping, for example. This would make it such that the stepper motor 42 would now require 200×8=1600 steps per revolution or conversely, the motor would operate at slower speed (⅛) when provided with a same given PWM pulse frequency operating in full step mode. The present invention takes advantage of these factors and provides variable dynamic stepper motor mode control to provide the best possible control and smoothest operation. If the required speed is high for example, the main microprocessor controller will place the motor control board (15) in a lower or even full step (1:1) control mode so the stepper motor goes faster for a given PWM output and keeps the PWM frequency range in the best operating range for the stepper motor and calculated by the main processor (12). If the speed is required to be slow, the microprocessor will determine this and change the mode to a higher (⅟₃₂ for example which drives the motor 32 times slower for a given PWM frequency than operating in full step mode) microstepping mode again keeping the PWM frequency in the optimal range. This variable dynamic microstepping minimizes steps while maintaining them within the motors optimum range.

Processor 41 sends a complete set of microstep pulse commands (number, direction, rate) to the motor driver controller 45 which controls the motor 49 to implement the pulse-width modulated (PWM) command set.

Finally, at step 360 processor 42 update the previous time, distance, location, pointing angle, and velocity with new values and continuously repeats the process of FIG. 10.

Preferably, the wireless communications between the remote communicating GPS tracking module 12 and base unit 2 are "paired" together automatically at start to ensure that only communication with said transmitter and "paired" receiver are used, and to allow multiple units to operate in the same area without interfering with the operation of other units. Similarly, data is sent by wireless communications between the smart phone 3 and base unit 2 and there are paired together to ensure only communication with each other, and to allow multiple units to operate in the same area without interfering with the operation of other units. Alternatively, a wired connection may be used by a wired connection (Apple lightning connector as an example).

Inasmuch as the invention is designed to track an individual player, the installed software App provided as part of the system includes a "highlights" mode of operation. This mode is selected via the software App via the user screen on the smart phone or via a pushbutton on the base station or via a verbal command to the smart phone device. In this mode of operation, the smart phone camera continuously buffers (temporarily saving a set amount of) video, the buffer size being configured during setup. The buffer size may be any time value from 10 seconds to 30 minutes. When the player wearing the GPS tracking pad does something that the videographer likes and would like to capture, they press the "highlights" button and the buffered video immediately preceding and following is saved as a recorded video file (for example, the previous 2 minutes so the user can see the play developing, and also the next 5 minutes or any time until the highlights button is pressed again or the highlight function times out and stops automatically as set up in the configuration file for the APP software by the user (5 minutes for example)). This reduces the video file sizes and allow the user to get the highlights they want rather than having to review and entire game video file.

Figure 11:
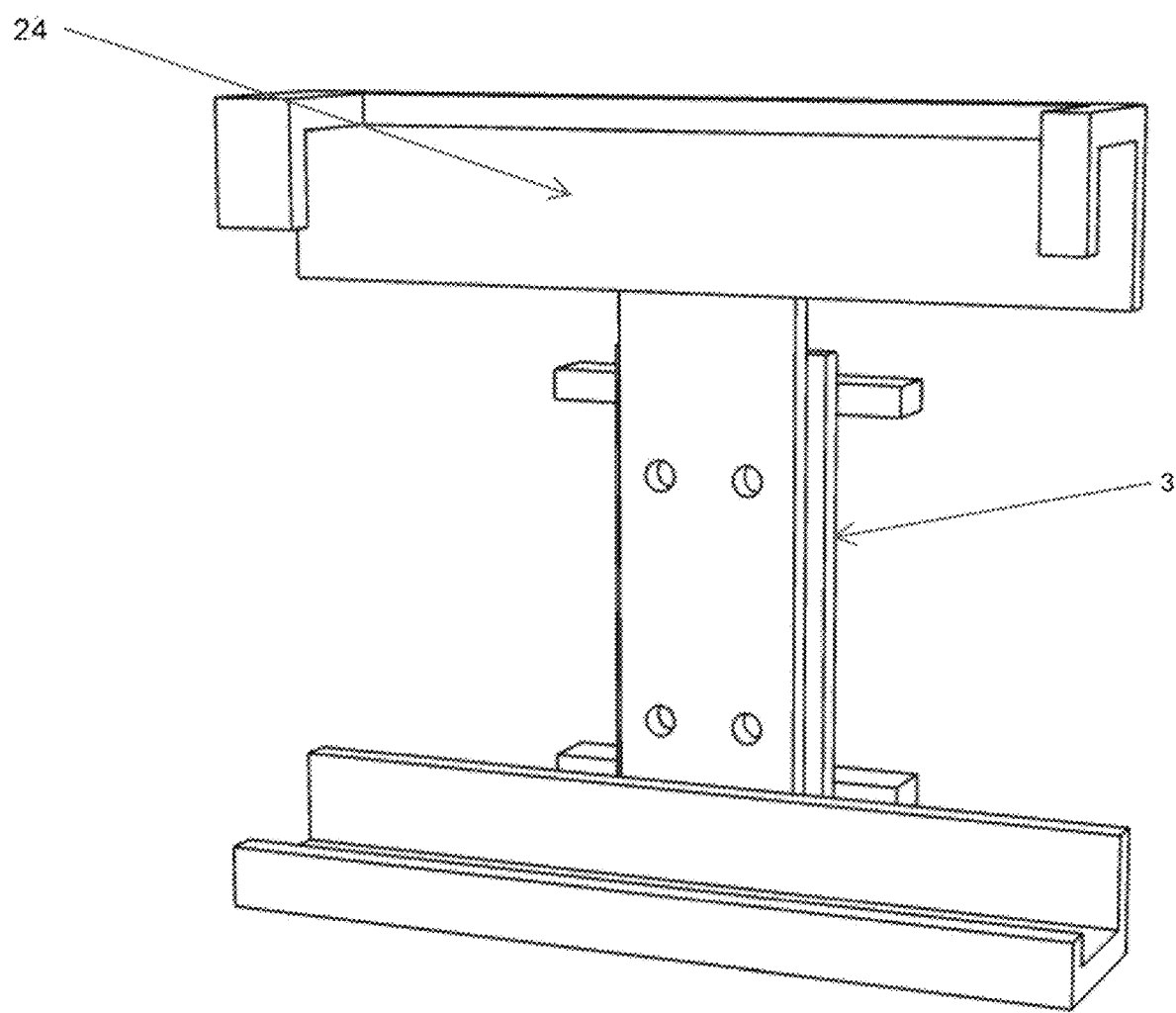
FIG. 11 is an enlarged view of an auxiliary mounting bracket suitable for larger devices, e.g., iPad®, tablets, etc.

FIG. 11 is an enlarged view of an exemplary adjustable device mounting bracket 24 which rotates above housing 22 on shaft 26 for generic use with a variety of smart phone devices 3. The mounting bracket 24 generally comprises an expandable spring-loaded frame for gripping a variety of smart phone devices 3, tablets, cameras etc., no matter their size differential. Importantly, the mounting bracket 24 provides full rearward access to the touchscreen of the smart phone 3 for manipulating camera functions and or the App, and full frontal clearance for the camera field of view. A clamping-type frame with fixed horizontal struts and adjustable vertical struts is best suited.

Figure 14:
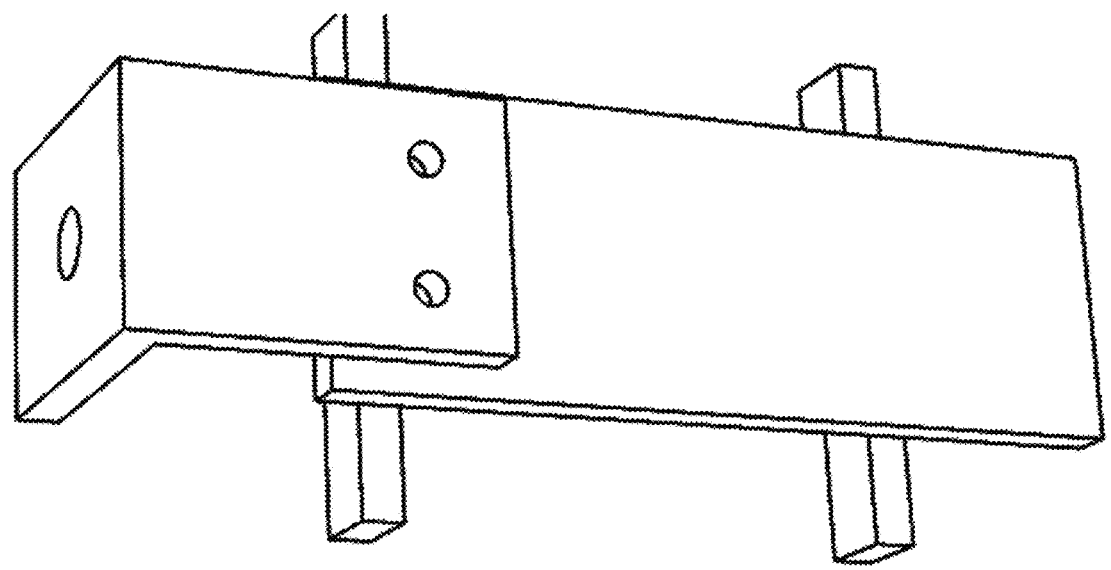
FIGS. 12-14 are three perspective views of an auxiliary mounting bracket for camcorders.
Figure 13:
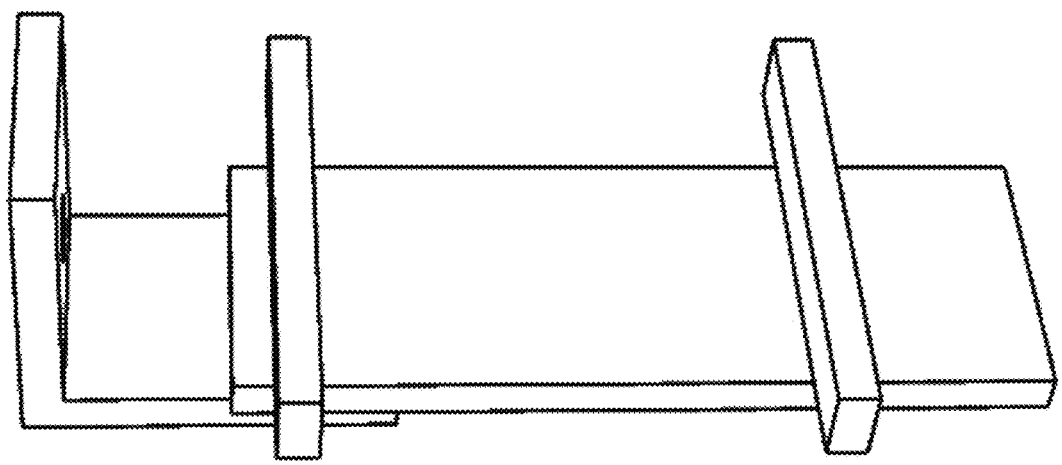
Figure 12:
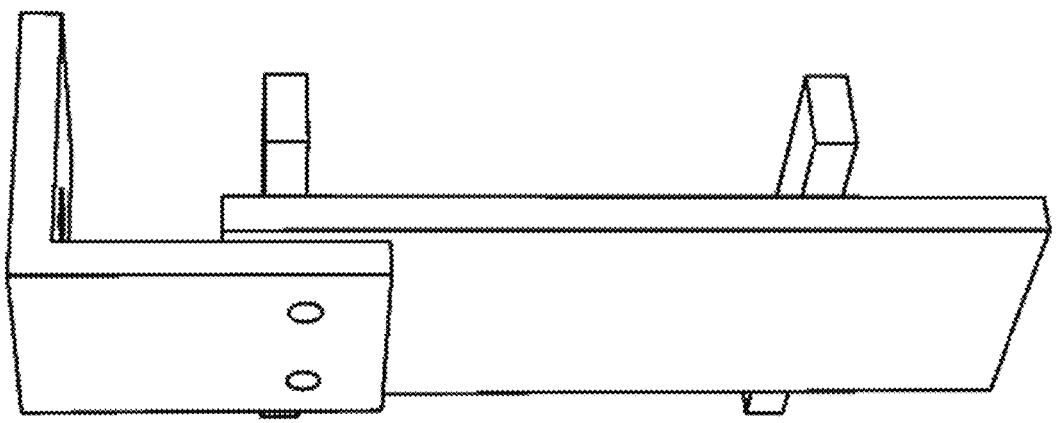

FIGS. 12-14 are three perspective views of an auxiliary mounting bracket 24 for camcorders. As before the mounting bracket generally comprises an expandable spring-loaded frame for gripping a variety of camcorders. A clamping-type frame with fixed horizontal struts and adjustable vertical struts is best suited.

In another embodiment of the invention an electronic compass may be added to the base unit 2 to provide the compass information for the main microprocessor 42. The compass information may be likewise communicated to the processor 42 via a wired or wireless connection and the auto alignment process will proceed as noted above.

In still another embodiment of the invention, the base unit 2 may be passive and merely transfer location and pointing angle data to the smart phone 3 located in bracket 24, allowing the smart phone 3 to complete the foregoing calculations and transmit final PWM data back to the base motor controller using the App (software program running on the smart phone 3). Compass heading data and other available data is already captured and available in the smart phone device. The resulting calculated required motor position and velocity commands are then sent to the microprocessor 42 in the base unit 2.

Figure 16:
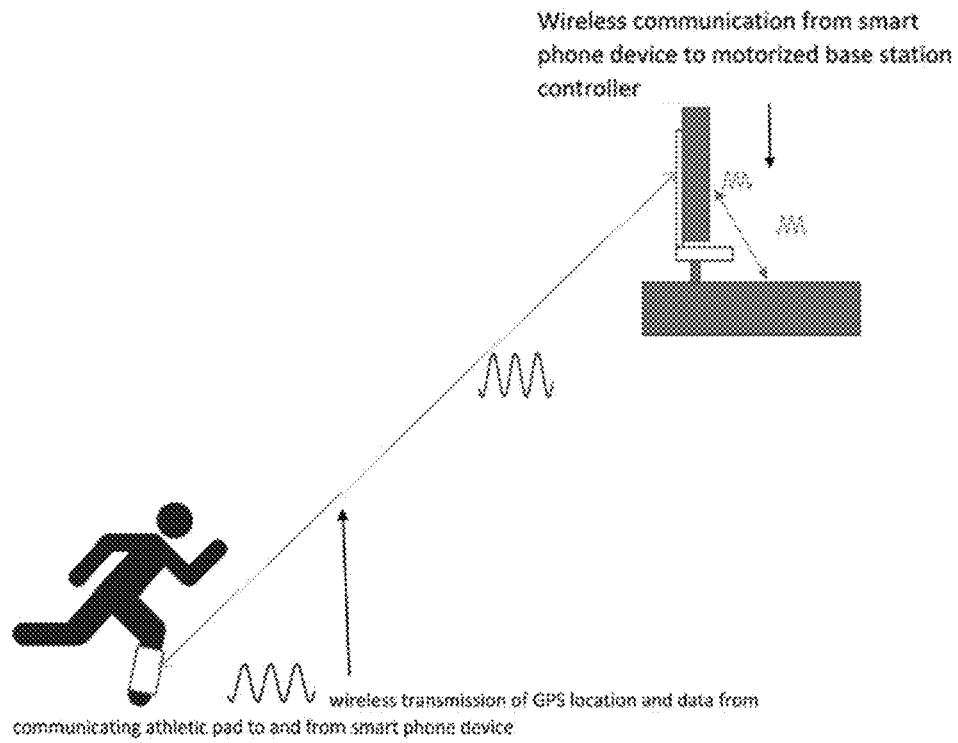
FIG. 16 shows the remote communicating architecture with GPS tracking module 12 communicating directly to the smartphone 3, and smart phone 3 communicating to motorized base station.

In still another embodiment of the invention, the GPS tracking module 12 may communicate directly to the smart phone 3 located in bracket 24 rather than to and through the base unit 2, using the built-in wireless communication interfaces in the smart phone 3. FIG. 16 shows the remote communicating architecture with GPS tracking module 12 communicating directly to the smartphone 3. This will allow the smart phone 3 to complete the foregoing calculations and transmit final simplified PWM data back to the base 2 motor controller 45 using the App (software program running on the smart phone 3). GPS data, compass heading data and other available data is already captured and available in the smart phone device. The resulting calculated required motor position and velocity commands are then sent to a simplified microprocessor 42 in the base unit 2 eliminating the need for the base unit 2 controller to communicate with the remote target sensor and streamlining the operation of the system.

In yet another embodiment the distance value (and delta distances) from base unit 2 to GPS tracking module 12 is communicated to the smart phone 3 via wireless communication as noted prior, and the value is used by the App operating on the smart phone to determine the best possible zoom value for the integrated video camera in the smart phone 3. Alternatively, the App operating on the smart phone may simply suggest an external lens available for use with smart phone 3 to enhance the range of the video camera functions. The present invention may also call upon the voice interaction and recognition capabilities of the smart phone 3 to provide hands free control of the system during operation. For example, when the target athlete does something very good the user simply speaks to the device at the time and says "Highlight". The location and time in the video recording are noted for quick reference and locating later during viewing time. Other commands are including "Pause", "Restart", etc.

In another embodiment, the present invention may utilize the image recognition capabilities of the smart phone 3 to provide an additional or supplemental means of target tracking at closer distances. If the controller or smart phone determines that the remote target sensor is sufficiently close where GPS locating may not be best method and the internal image recognition in the smart phone is operating, the system will switch over to image recognition tracking on the fly and determine the best pointing angle for the smart phone device and command the motor accordingly and also switch back when the distance is further and best suited for GPS control.

In all the foregoing embodiments the motorized base unit 2 receives the transmitted GPS, orientation, and timestamp data and orients the smartphone camera at the target to provide smoother more accurate tracking of an athlete in motion.

Figure 17:
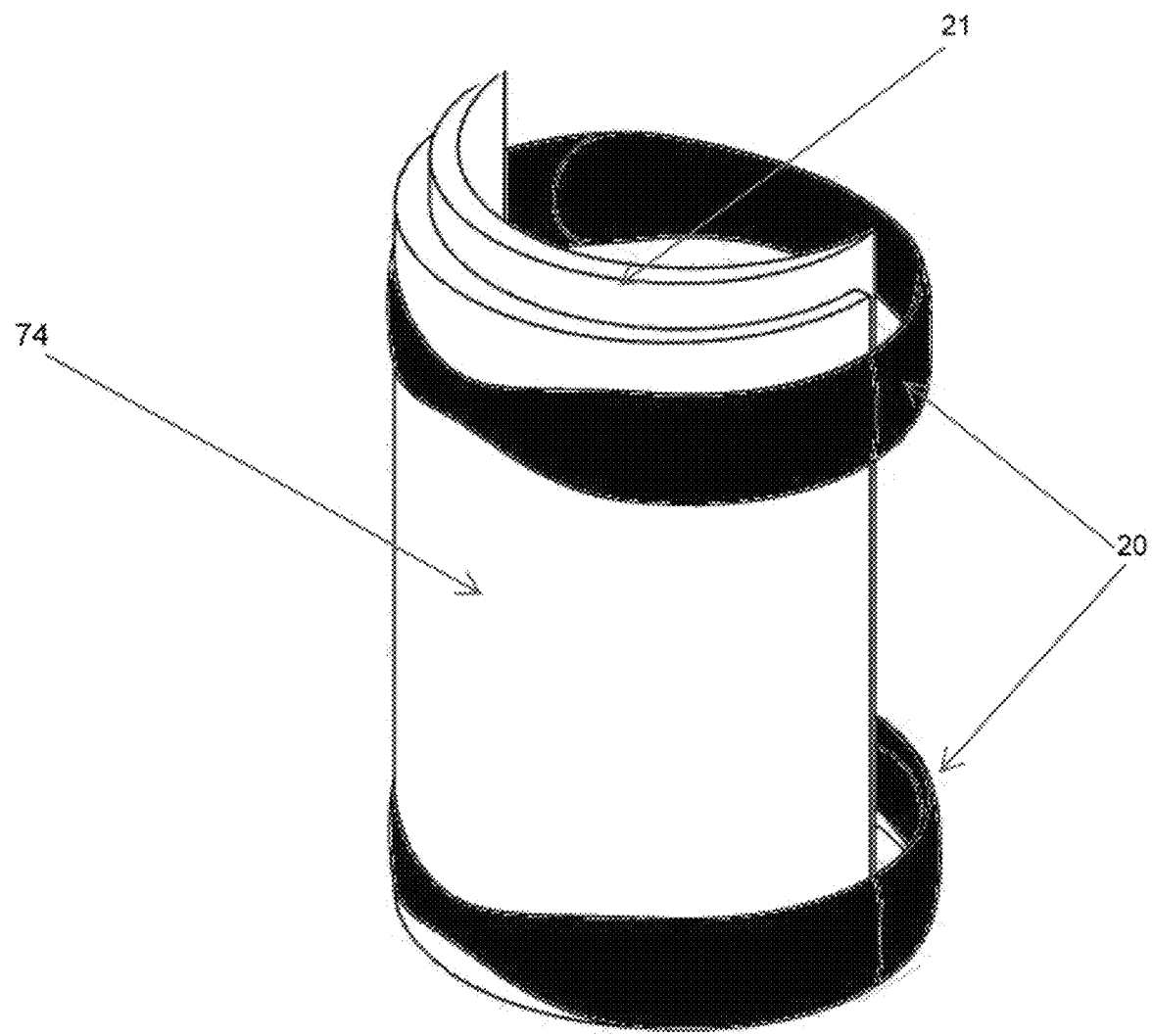
FIG. 17 is a side perspective view of an embodiment of the athletic pad 10 configured as a shin pad.

Having now fully set forth the preferred embodiment and certain modifications of the concept underlying the present invention, various other embodiments as well as certain variations and modifications of the embodiments shown and described will obviously occur to those skilled in the art upon becoming familiar with the concept. For example, as indicated above the athletic protective pad 10 may be modified in construction and form to serve as a shin pad, elbow pad, forearm pad or leg pad as required for different sports but of similar construction and function as noted herein. FIG. 17 is a side perspective view of an embodiment of the athletic pad 10 configured as a shin pad. Design and construction is similar to the embodiment of FIG. 5 except that dimensions and shape, e.g., of the protective foam padding layer 74, may change to suit the nature of the limb to be protected, and various straps or other attachment devices may be used without departing from the scope and spirit of the invention. For example, two or more sets of hook-and-loop attachment straps 20 may be utilized for securement.

It is to be understood, therefore, that the invention may be practiced other than as specifically set forth herein.

I claim:

1. A system for photographing a moving target with a portable smart device having a camera, comprising:
   an athletic pad configured for protecting said athlete, said athletic pad including,
      a resilient plastic shell,
      a foam pad attached to said plastic shell,
      a GPS tracking module embedded in said plastic shell and covered by said foam pad, said GPS tracking module being configured for periodically transmitting GPS data;
   a software application stored in said portable smart device and operative to periodically transmit position data; and
   a base unit for photographing said moving athlete in motion, including,
      a housing,
      a wireless communication transceiver mounted in said housing and in communication with said GPS tracking module and configured for periodically receiving said transmitted GPS data, and in communication with said smart device and configured to periodically receive said position data,
      a motor driver circuit mounted in said housing,
      a motor in communication with said motor driver circuit,
      a smart device mounting bracket in operative engagement with the shaft of said motor and including a cradle extending externally of said smart device for gripping said smart device,
      a processor mounted in said housing an in communication with transceiver and motor driver circuit, said processor comprising software instructions for executing the steps of periodically inputting the GPS data from said GPS tracking module, periodically inputting the position data transmitted from said portable smart device, calculating a delta angle and delta velocity when said athletic pad moves, converting said delta angle and delta velocity to pulse-width modulated (PWM) commands, and outputting said PWM commands to said motor driver;
      whereby the portable smart device camera tracks said moving athlete for imaging when said smart device is mounted in said cradle.

2. The system according to claim 1, wherein said resilient plastic shell comprises separate internal compartments.

3. The system according to claim 1, wherein said athletic pad is any one of a shin pad, elbow pad and forearm pad.

4. The system according to claim 1, wherein the position data of said smart device comprises either one or both of orientation data and location data.

5. The system according to claim 1, wherein said motor is a stepper motor.

6. The system according to claim 1, further comprising an orientation sensor mounted proximate the motor shaft.

7. The system according to claim 6, wherein said orientation sensor is connected to said motor by a rubber belt.

8. The system according to claim 6, wherein said orientation sensor is a potentiometer mounted proximate the motor shaft.

9. The system according to claim 1, wherein said software application stored in said portable smart device buffers video from said camera.

10. The system according to claim 1, wherein said athletic pad comprises any one of an elbow pad, knee pad, forearm pad and shin pad.

11. A system for photographing a moving target with a portable smart device having a camera, comprising:
   a GPS tracking module including a GPS receiver for periodically communicating GPS data,
   and
   a base unit, including,
      a housing,
      a wireless communication transceiver mounted in said housing and in communication with said GPS tracking module and configured for periodically receiving said transmitted GPS data,
      a motor driver circuit mounted in said housing,
      a motor in communication with said motor driver circuit,
      a smart device mounting bracket in operative engagement with the shaft of said motor and including a cradle extending externally of said smart device for gripping said smart device,
      said wireless communication transceiver mounted in said housing also being in communication with said smart device for periodically receiving location data and orientation data there from;
      a processor mounted in said housing and in communication with said transceiver and motor driver circuit, said processor comprising software instructions for executing the steps of periodically inputting the GPS data from said GPS tracking module, periodically inputting the location and orientation data from said smart device, calculating distance and velocity when said target moves, converting said distance and velocity to an output signal for driving said motor driver;
      whereby the portable device camera tracks said moving target for imaging when said smart device is mounted in said cradle.

12. The system according to claim 11, wherein said motor is a stepper motor.

13. The system according to claim 11, wherein the location data periodically received from said smart device comprises data corresponding to a location of said base unit.

* * * * *